(12) United States Patent
Iwase et al.

(10) Patent No.: US 9,020,711 B2
(45) Date of Patent: Apr. 28, 2015

(54) ROAD SLOPE ESTIMATING DEVICE (71) Applicant: Aisin AW Co., Ltd., Anjo-shi, Aichi-ken (JP)

(72) Inventors: Masakatsu Iwase, Anjo (JP); Shinya Tsuzuki, Nishio (JP); Taichi Ikoma, Anjo (JP); Eiji Moriyama, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 14/342,638

(22) PCT Filed: Dec. 13, 2012

(86) PCT No.: PCT/JP2012/082339
§ 371 (c)(1),
(2) Date: Mar. 4, 2014

(87) PCT Pub. No.: WO2013/089184
PCT Pub. Date: Jun. 20, 2013

(65) Prior Publication Data
US 2014/0229081 A1    Aug. 14, 2014

(30) Foreign Application Priority Data
Dec. 15, 2011    (JP) .................................. 2011-274645

(51) Int. Cl.
*B60W 40/076*    (2012.01)
*F16H 59/66*    (2006.01)
(Continued)

(52) U.S. Cl.
CPC .............. *B60W 40/076* (2013.01); *F16H 59/48* (2013.01); *F16H 59/66* (2013.01); *F16H 61/0403* (2013.01); *F16H 61/686* (2013.01); *F16H 2059/148* (2013.01); *F16H 2059/663* (2013.01); *F16H 2059/462* (2013.01)

(58) Field of Classification Search
None
See application file for complete search history.

(56) References Cited

U.S. PATENT DOCUMENTS

| | | | | |
|---|---|---|---|---|
| 4,354,236 A * | 10/1982 | Miki et al. | ....................... | 701/66 |
| 5,611,748 A * | 3/1997 | Kashiwabara | ................... | 477/47 |
| 5,669,847 A * | 9/1997 | Kashiwabara | ................... | 477/46 |
| 2010/0256883 A1* | 10/2010 | Sauter | ............................. | 701/65 |

FOREIGN PATENT DOCUMENTS

| | | |
|---|---|---|
| JP | A-6-344802 | 12/1994 |
| JP | A-10-153253 | 6/1998 |

(Continued)

OTHER PUBLICATIONS

International Search Report issued in International Patent Application No. PCT/JP2012/082339 dated Jan. 29, 2013.

*Primary Examiner* — Justin Holmes
(74) *Attorney, Agent, or Firm* — Oliff PLC (57) ABSTRACT

A road slope estimating device which is mounted on a vehicle and estimates a slope of a road on which the vehicle is traveling, the vehicle including a motor and a transmission capable of changing a shift speed by an engagement switching operation of disengaging one of a plurality of engagement elements and engaging another one of the plurality of engagement elements, and outputting power from the motor via the transmission to travel. An estimating section carries out first road slope estimation from the computed output torque and acceleration of the vehicle until transfer of torque is handed over from the engagement element to be disengaged of the plurality of engagement elements to the engagement element to be engaged. Second road slope estimation is estimated from the computed output torque and the acceleration of the vehicle when the handover of the transfer of torque is carried out.

4 Claims, 8 Drawing Sheets

(51) Int. Cl.

*F16H 59/48* (2006.01)
*F16H 61/04* (2006.01)
*F16H 61/686* (2006.01)
*F16H 59/14* (2006.01)
*F16H 59/46* (2006.01)

(56) References Cited

FOREIGN PATENT DOCUMENTS

| | | |
|---|---|---|
| JP | A-11-303979 | 11/1999 |
| JP | A-11-303980 | 11/1999 |
| JP | A-2006-322588 | 11/2006 |

* cited by examiner

|  |  | C-1 | C-2 | C-3 | B-1 | B-2 | F-1 |
|---|---|---|---|---|---|---|---|
|  | P |  |  |  |  |  |  |
|  | REV |  |  | O |  | O |  |
|  | N |  |  |  |  |  |  |
| D | 1st | O |  |  |  | (O) | O |
|  | 2nd | O |  |  | O |  |  |
|  | 3rd | O |  | O |  |  |  |
|  | 4th | O | O |  |  |  |  |
|  | 5th |  | O | O |  |  |  |
|  | 6th |  | O |  | O |  |  |

| SHIFT PATTERN | CLUTCH THAT TRANSFERS TORQUE WHILE ROTATION IS BEING CHANGED | TIMING OF SWITCHING GEAR RATIO |
|---|---|---|
| PowerOnUp | CLUTCH TO BE ENGAGED | WHEN INERTIA PHASE IS STARTED |
| CoastDown | | |
| PowerOffUp | | |
| ManualDown | | |
| PowerOnDown | CLUTCH TO BE DISENGAGED | WHEN ROTATION IS SYNCHRONIZED |

FIG. 8

ROAD SLOPE ESTIMATING DEVICE

TECHNICAL FIELD

The present invention relates to road slope estimating devices which are mounted on a vehicle and estimate the slope of a road on which the vehicle is traveling. The vehicle includes a motor and a transmission capable of changing a shift speed by performing an engagement switching operation of disengaging one of a plurality of engagement elements and engaging another one of the plurality of engagement elements, and outputs power from the motor via the transmission to travel.

BACKGROUND ART

Conventionally, devices that estimate a road slope based on the driving force for driving wheels and vehicle acceleration have been proposed as this type of road slope estimating devices (see, e.g., Patent Document 1). Such a device includes a number-of-rotation sensor (rotational speed sensor) that detects the number of rotations (rotational speed) of a turbine shaft as an input shaft of an automatic transmission. The device calculates the driving force for the driving wheels by subtracting gear loss from turbine torque (input torque) and multiplying the resultant difference by a gear ratio, and calculates the vehicle acceleration by dividing a deviation of a turbine rotational speed received this time from a turbine rotational speed received last time by a current gear ratio of the automatic transmission when shifting is not being performed. When the shifting is being performed, or before a predetermined time passes after the shifting, the device maintains the vehicle acceleration that was set last time.

RELATED ART DOCUMENT

Patent Document

[Patent Document 1] Japanese Patent Application Publication No. H10-153253 (JP H10-153253 A)

SUMMARY OF THE INVENTION

In the above device, the driving force for the driving wheels is calculated by subtracting gear loss from the input torque of the transmission and multiplying the resultant difference by the gear ratio, but the gear ratio that is used for the calculation while the shifting is being performed is not mentioned. In a transmission of the type in which the shift speed is changed by performing an engagement switching operation of disengaging one of a plurality of engagement elements (clutches and brakes) and engaging another one of the plurality of engagement elements, transfer of torque is handed over from the engagement element to be disengaged to the engagement element to be engaged and the rotational speed of an input shaft is changed when shifting is performed. A driving force for driving wheels thus fluctuates, and a calculated driving force may be different from an actual driving force. In this case, it is difficult to accurately estimate a road slope.

It is a primary object of a road slope estimating device of the present invention to more accurately estimate a road slope even when a shift speed is being changed.

The road slope estimating device of the present invention uses the following means in order to attain the above primary object.

A road slope estimating device of the present invention, which is mounted on a vehicle and estimates a slope of a road on which the vehicle is traveling, the vehicle including a motor and a transmission capable of changing a shift speed by an engagement switching operation of disengaging one of a plurality of engagement elements and engaging another one of the plurality of engagement dements, and outputting power from the motor via the transmission to travel, includes: a shifting road slope estimating section that carries out first road slope estimation in which the output torque is computed based on the input torque and a speed ratio of a shift speed before shifting of the transmission and the road slope is estimated from the computed output torque and acceleration of the vehicle until transfer of torque is handed over from the engagement element to be disengaged of the plurality of engagement elements to the engagement element to be engaged, and carries out second road slope estimation in which the output torque is computed based on the input torque and a speed ratio of a shift speed after shifting of the transmission and the road slope is estimated from the computed output torque and the acceleration of the vehicle when the handover of the transfer of torque is carried out, in a case where the shift speed is being changed by the engagement switching operation.

The road slope estimating device of the present invention carries out the first road slope estimation in which the output torque is computed based on the input torque and the speed ratio of the shift speed before shifting of the transmission and the road slope is estimated from the computed output torque and the acceleration of the vehicle until the transfer of torque is handed over from the engagement element to be disengaged of the plurality of engagement elements to the engagement element to be engaged, and carries out the second road slope estimation in which the output torque is computed based on the input torque and the speed ratio of the shift speed after shifting of the transmission and the road slope is estimated from the computed output torque and the acceleration of the vehicle when the handover of the transfer of torque is carried out, in the case where the shift speed of the transmission is being changed. The speed ratio that is used to compute the output torque is thus switched from the speed ratio of the shift speed before shifting before the transfer of torque is handed over from the clutch to be disengaged to the clutch to be engaged and to the speed ratio of the shift speed after shifting after the transfer of torque is handed over. This can reduce the difference between the computed output torque and actual output torque even when the shift speed is being changed. As a result, the road slope can be more accurately estimated even when the shift speed is being changed.

The road slope estimating device of the present invention may further include: a non-shifting road slope estimating section that computes the output torque that is output to an output shaft of the transmission, based on the input torque that is applied to an input shaft of the transmission and a speed ratio of a current shift speed of the transmission, and estimates the road slope from the computed output torque and the acceleration of the vehicle, in a case where the shift speed is not being changed by the engagement switching operation.

In the road slope estimating device of the present invention, the transmission may have, as a shift pattern, a first shift pattern in which the shift speed is changed by a torque phase in which the transfer of torque is handed over from the engagement element to be disengaged to the engagement element to be engaged, and an inertia phase in which a rotational speed of the input shaft is changed to a rotational speed according to the shift speed after shifting with the transfer of torque being performed by the engagement element to be engaged, and when the shift speed is changed in the first shift pattern, the shifting road slope estimating section may carry out the first road slope estimation until the inertia phase is started, and carry out the second road slope estimation after the inertia phase is started. The road slope can thus be more accurately estimated even when the shift speed is changed in the first shift pattern.

In the road slope estimating device of the present invention, the transmission may have, as the shift pattern, a second shift pattern in which the rotational speed of the input shaft is changed to the rotational speed according to the shift speed after shifting with the transfer of torque being performed by the engagement element to be disengaged, and the engagement element to be engaged is engaged when the rotational speed of the input shaft is changed to the rotational speed according to the shift speed after shifting, and when the shift speed is changed in the second shift pattern, the shifting road slope estimating section may carry out the first road slope estimation until the rotational speed of the input shaft is changed to the rotational speed according to the shift speed after shifting, and may carry out the second road slope estimation after the rotational speed of the input shaft is changed to the rotational speed according to the shift speed after shifting. The road slope can thus be more accurately estimated even when the shift speed is changed in the second shift pattern.

MODES FOR CARRYING OUT THE INVENTION

A best mode for carrying out the present invention will be described below by using an embodiment.

Figure 1:
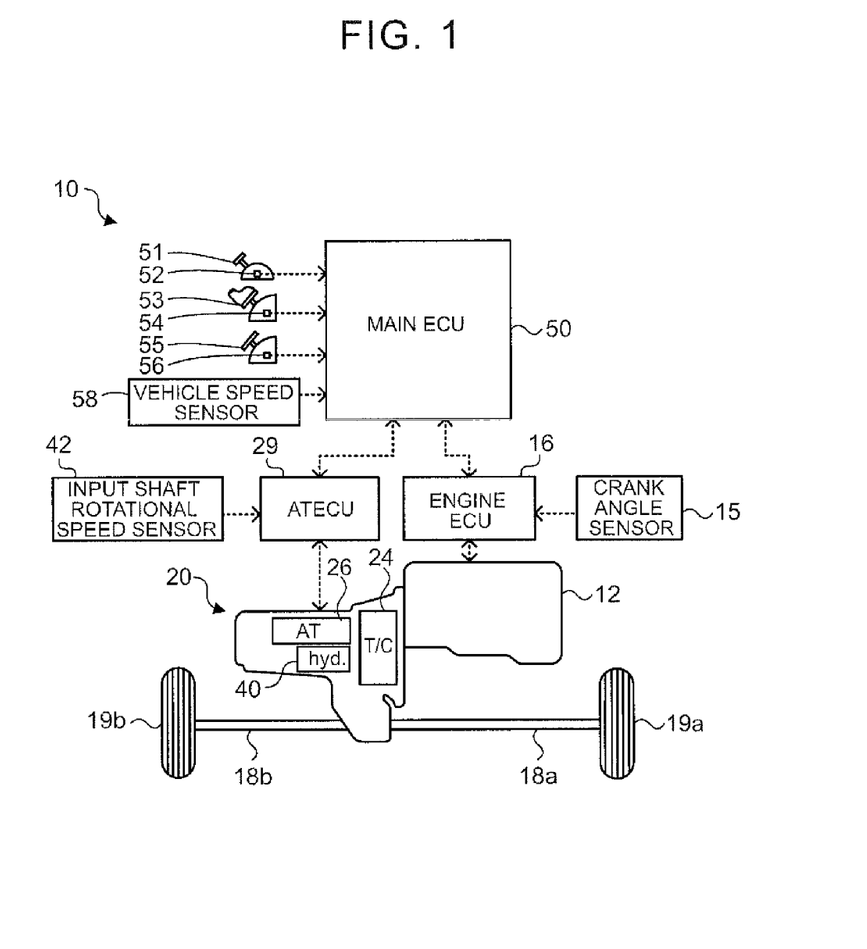
FIG. 1 is a configuration diagram showing a schematic configuration of a vehicle 10 having a road slope estimating device of the present invention mounted thereon.
Figure 2:
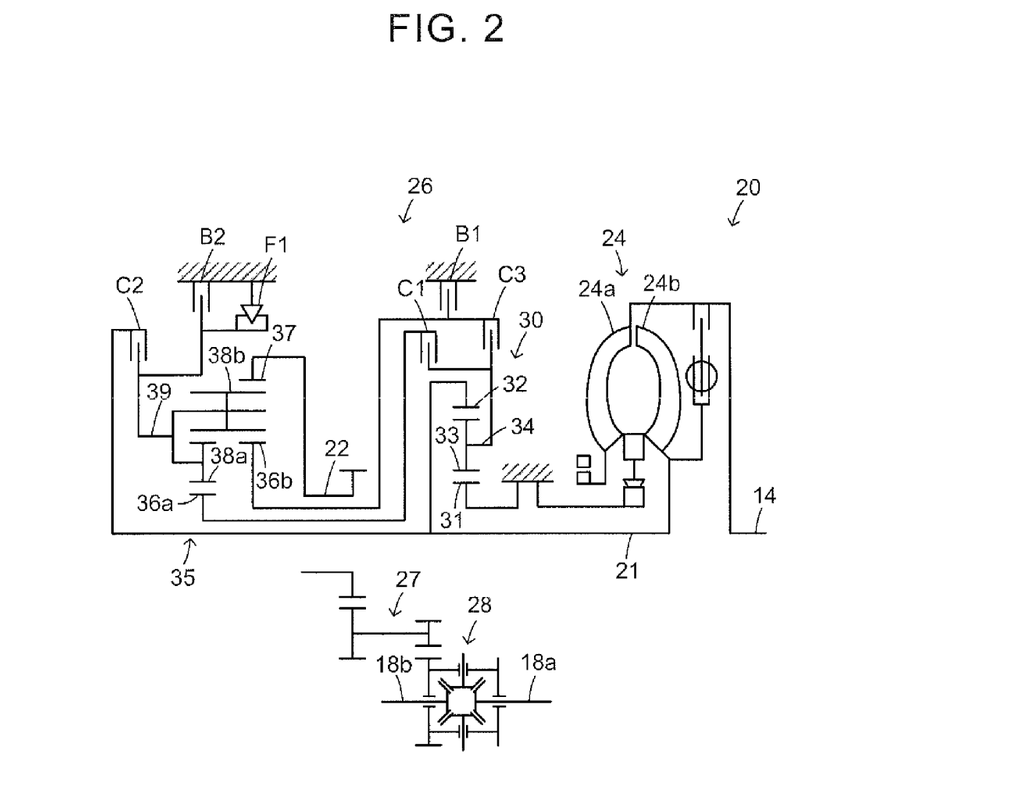
FIG. 2 is a configuration diagram showing a schematic configuration of a speed change mechanism 26.
Figure 3:
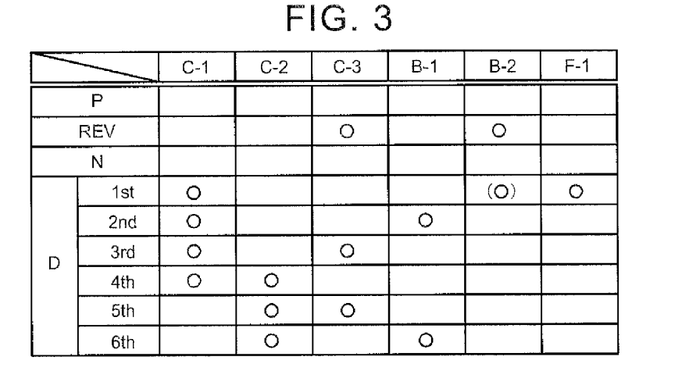
FIG. 3 is an illustration showing an example of an operation table of the speed change mechanism 26.

FIG. 1 is a configuration diagram showing a schematic configuration of a vehicle 10 having an automatic transmission 20 mounted thereon. FIG. 2 is a configuration diagram showing a schematic configuration of a speed change mechanism 26. FIG. 3 is an illustration showing an operation table of the speed change mechanism 26.

As shown in FIG. 1, the automobile 10 of the embodiment includes: an engine 12 as an internal combustion engine that outputs power by explosive combustion of hydrocarbon fuel such as gasoline or light oil; an engine electronic control unit (hereinafter referred to as the "engine ECU") 16 that receives data on the operating state of the engine 12 such as a crank angle from a crank angle sensor 15 to perform operation control of the engine 12; the automatic transmission 20 that is connected to a crankshaft 14 (see FIG. 2) of the engine 12 and connected to axles 18a, 18b of left and right wheels 19a, 19b, and that changes the speed of power from the engine 12 to transmit the power to the axles 18a, 18b; a transmission electronic control unit (hereinafter referred to as the "ATECU") 29 that controls the automatic transmission 20 and also functions as a road slope estimating device of the embodiment which estimates the slope of a road on which the automobile 10 is traveling; and a main electronic control unit (hereinafter referred to as the main ECU) 50 that controls the entire vehicle. The main ECU 50 receives a shift position SP from a shift position sensor 52 that detects the operation position of a shift lever 51, an accelerator operation amount Acc from an accelerator pedal position sensor 54 that detects the stepping amount of an accelerator pedal 53, a brake switch signal BSW from a brake switch 56 that detects stepping on a brake pedal 55, a vehicle speed V from a vehicle speed sensor 58, etc. In the embodiment, a parking position (P position) that is used for parking, a reverse position (R position) for reverse travel, a neutral position (N position) as a neutral state, a normal drive position (D position) for forward travel, a low position (L position) and a second position (2 position) which allow engine brake to work in an accelerator off state, etc. are prepared as shift positions of the shift lever 51. The main ECU 50 is connected to the engine ECU 16 and the ATECU 29 via communication ports so that the main ECU 50 can transmit and receive various control signals and data to and from the engine ECU 16 and the ATECU 29.

As shown in FIG. 2, the automatic transmission 20 is configured as a transaxle device that transmits power from the engine 12 to the axles 18a, 18b, and includes: a torque converter 24 with a lockup clutch which is formed by an input-side pump impeller 24a connected to the crankshaft 14 of the engine 12 and an output-side turbine runner 24b; a stepped speed change mechanism 26 that has an input shaft 21 connected to the turbine runner 24b of the torque converter 24 and an output shaft 22 connected to the axles 18a, 18b via a gear mechanism 27 and a differential gear 28, and that changes the speed of power received by the input shaft 21 to output the power to the output shaft 22; and a hydraulic circuit 40 (see FIG. 1) that drives and controls the speed change mechanism 26.

The speed change mechanism 26 is configured as a six-speed stepped transmission, and includes a single-pinion type planetary gear mechanism 30, a Ravigneaux type planetary gear mechanism 35, three clutches C1, C2, C3, two brakes B1, B2, and a one-way clutch F1. The single-pinion type planetary gear mechanism 30 includes a sun gear 31 as an external gear, a ring gear 32 as an internal gear placed on a concentric circle with the sun gear 31, a plurality of pinion gears 33 meshing with the sun gear 31 and meshing with the ring gear 32, and a carrier 34 holding the plurality of pinion gears 33 so that the pinion gears 33 can rotate and revolve. The sun gear 31 is fixed to a case of the automatic transmission 20, and the ring gear 32 is connected to the input shaft 21. The Ravigneaux type planetary gear mechanism 35 includes two sun gears 36a, 36b as external gears, a ring gear 37 as an internal gear, a plurality of short pinion gears 38a meshing with the sun gear 36a, a plurality of long pinion gears 38b meshing with the sun gear 36b and the plurality of short pinion gears 38a and meshing with the ring gear 37, and a career 39 coupling the plurality of short pinion gear 38a and the plurality of long pinion gears 38b and holding the plurality of short pinion gear 38a and the plurality of long pinion gears 38b so that the plurality of short pinion gear 38a and the plurality of long pinion gears 38b can rotate and revolve. The sun gear 36a is connected to the career 34 of the single-pinion type planetary gear mechanism 30 via the clutch C1, the sun gear 36b is connected to the carrier 34 via the clutch C3 and is connected to the case of the automatic transmission 20 via the brake B1, the ring gear 37 is connected to the output shaft 22, and the career 39 is connected to the input shaft 21 via the clutch C2. The carrier 39 is connected to the case of the automatic transmission 20 via the one-way clutch F1 so that rotation of the carrier 39 is restricted to one direction, and is connected to the case of the automatic transmission 20 via the brake B2 that is provided in parallel with the one-way clutch F1.

Figure 4:
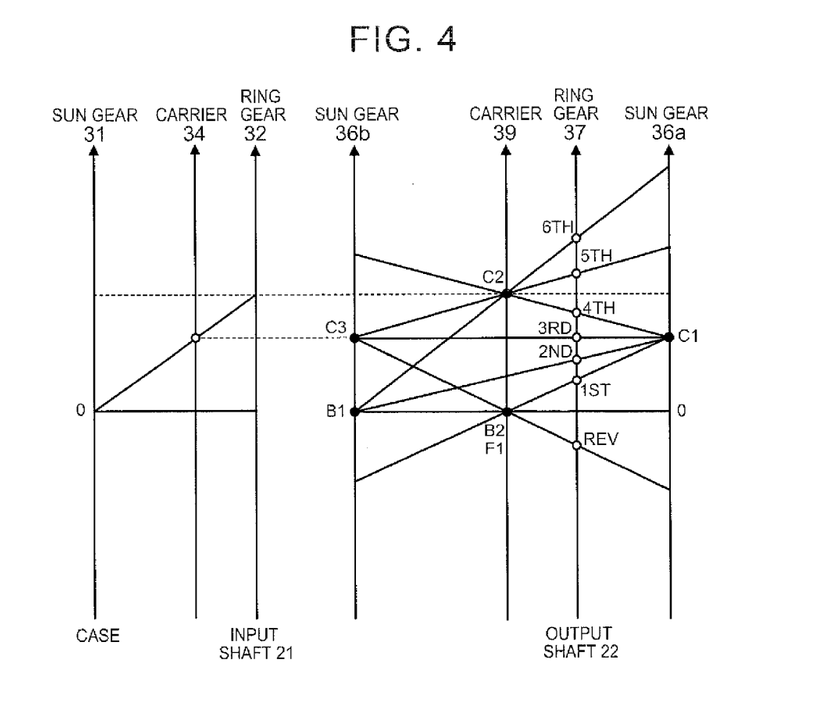
FIG. 4 is a speed diagram showing the relation of the rotational speed among rotating elements of the speed change mechanism 26.

As shown in the operation table of FIG. 3, the speed change mechanism 26 can switch the shift speed to first to sixth forward speeds, a reverse speed, and a neutral state according to engagement and disengagement of the clutches C1 to C3 and engagement and disengagement of the brakes B1, B2. The reverse speed can be attained by engaging the clutch C3 and the brake B2 and disengaging the clutches C1, C2 and the brake B1. The first forward speed can be attained by engaging the clutch C1 and disengaging the clutches C2, C3 and the brakes B1, B2. At the first forward speed, the brake B2 is engaged when the engine brake is in operation. The second forward speed can be attained by engaging the clutch C1 and the brake B1 and disengaging the clutches C2, C3 and the brake B2. The third forward speed can be attained by engaging the clutches C1, C3 and disengaging the clutch C2 and the brakes B1, B2. The forth forward speed can be attained by engaging the clutches C1, C2 and disengaging the clutch C3 and the brakes B1, B2. The fifth forward speed can be attained by engaging the clutches C2, C3 and disengaging the clutch C1 and the brakes B1, B2. The sixth forward speed can be attained by engaging the clutch C2 and the brake B1 and disengaging the clutches C1, C3 and the brake B2. The neutral state can be attained by disengaging all of the clutches C1 to C3 and the brakes B1, B2. FIG. 4 shows a speed diagram of the relation of the rotational speed among the rotating elements of the speed change mechanism 26 at each of the first to sixth forward speeds and the reverse speed.

Although not shown in detail, the ATECU 29 is configured as a microprocessor having a CPU as a core component, and includes, in addition to the CPU, a ROM that stores a processing program, a RAM that temporarily stores processing data, input/output ports, a communication port. An input shaft rotational speed Nin from an input shaft rotational speed sensor 42 attached to the input shaft 21 of the speed change mechanism 26, etc. is input to the ATECU 29 via the input port, and a drive signal for each solenoid, not shown, of the hydraulic circuit 40, etc. is output from the ATECU 29 via the output port. As described above, the ATECU 29 communicates with the main ECU 50 and the engine ECU 16, and transmits and receives a control signal and data to and from the main ECU 50 and the engine ECU 16.

A normal map and a hill road map in which upshift and downshift lines for hill climbing are shifted to the high vehicle speed side with respect to the normal map are prepared as shift maps that are used to determine a shift speed based on the throttle opening and the vehicle speed V, and shift control of the automatic transmission 20 thus configured is performed by selecting either the normal map or the hill road map based on the slope (road slope) θ of a road on which the automobile is traveling, determining the shift speed based on the selected shift map, the throttle opening, and the vehicle speed V, and engaging and disengaging required clutches (brakes) so as to attain the shift speed determined by the speed change mechanism 26. The engagement and disengagement of the clutches are performed by setting an oil pressure command Prel for the clutch to be disengaged and an oil pressure command Papp for the clutch to be engaged, and driving and controlling the relevant solenoids of the hydraulic circuit 40 based on the set oil pressure commands Prel, Papp.

Figure 5:
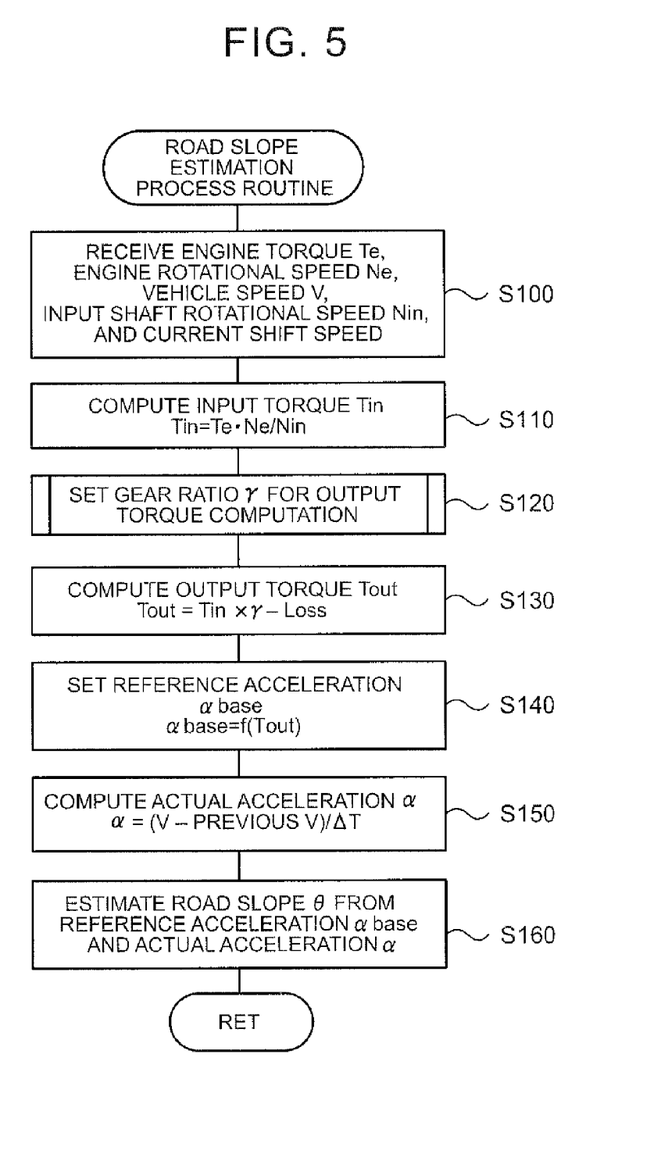
FIG. 5 is a flowchart showing an example of a road slope estimation process routine that is executed by an ATECU 29.

Operation of the automobile 10 thus configured, particularly the operation that is performed when estimating the road slope θ, will be described below. FIG. 5 is a flowchart showing an example of a road slope estimation process routine that is executed by the CPU of the ATECU 29. This routine is repeatedly executed at predetermined time intervals (e.g., every several milliseconds).

When executing the road slope estimation process routine, the CPU of the ATECU 29 first performs a process of receiving data required for the processing, such as the engine torque Te, the engine rotational speed Ne, the vehicle speed V, the input shaft rotational speed NM from the input shaft rotational speed sensor 42, and the shift state of the speed change mechanism 26 (step S100). As the engine torque Te, the CPU of the ATECU 29 receives the engine torque derived from the throttle opening, not shown, of the engine 12 from the engine ECU 16 via the main ECU 50 by communication. As the engine rotational speed Ne, the CPU of the ATECU 29 receives the engine rotational speed computed based on the rotation angle of the crankshaft 14 detected by the crank angle sensor 15 from the engine ECU 16 via the main ECU 50 by communication. As the vehicle speed V, the CPU of the ATECU 29 receives the vehicle speed detected by the vehicle speed sensor 58 from the main ECU 50 by communication. As the shift state of the speed change mechanism 26, the CPU of the ATECU 29 receives a current shift speed and its gear ratio γc, which are stored as the state of the speed change mechanism 26, when no command to change the shift speed (command to perform shifting) is received, and receives a shift speed before shifting and its gear ratio γbe and a shift speed after shifting and its gear ratio γaf, which are stored as the state of the speed change mechanism 26, when a command to perform shifting is received.

After receiving the data required for the processing, the CPU of the ATECU 29 calculates input torque Tin as the torque that is applied to the input shaft 21 by dividing the product of the engine torque Te and the engine rotational speed Ne by the input shaft rotational speed Nin (step S110), and sets the gear ratio γ of the speed change mechanism 26 for output torque computation (step S120). This process is performed by executing an output torque computation gear ratio setting process shown as an example in FIG. 6 as described below. After setting the gear ratio γ of the speed change mechanism 20, the CPU of the ATECU 29 computes output torque Tout as the torque that is output from the output shaft 22, by using the following expression (1) based on the computed input torque Tin and the set gear ratio γ (step S130). In expression (1), "Loss" represents gear loss.

$$Tout = Tin \times \gamma - Loss \qquad (1)$$

After computing the output torque Tout, the CPU of the ATECU 29 sets reference acceleration αbase based on the computed output torque Tout (step S140). The reference acceleration α is, e.g., the acceleration that is obtained when the automobile is traveling on a flat road with the output torque Tout, and can be computed based on the output torque Tout, the vehicle weight, the travel resistance, the differential gear ratio, the tire diameter, etc. The CPU of the ATECU 29 computes actual acceleration α as an actual value of acceleration by dividing a deviation of the vehicle speed V received this time from the vehicle speed received last time by an execution time interval ΔT of this routine (step S150), and estimates the road slope θ from a deviation of the actual acceleration α from the set reference acceleration αbase (step S160), thereby terminating the routine.

Figure 6:
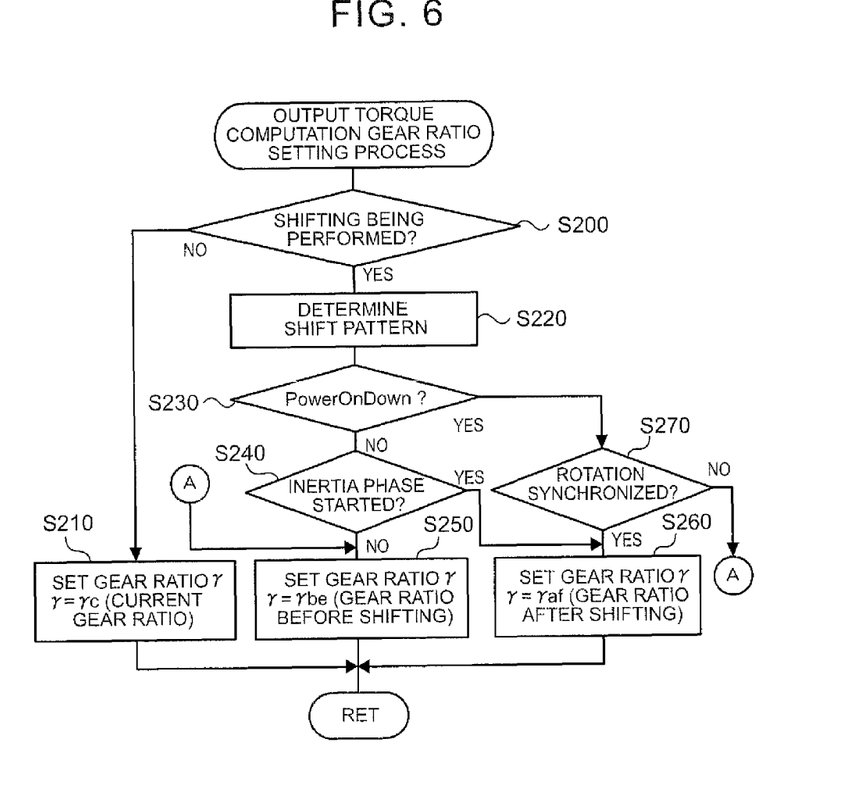
FIG. 6 is a flowchart showing an example of an output torque computation gear ratio setting process that is executed by the ATECU 29.

The output torque computation gear ratio setting process in FIG. 6 will be described below. In the output torque computation gear ratio setting process, the CPU of the ATECU 29 first determines if shifting is being performed (step S200). If it is determined that shifting is not being performed, the CPU of the ATECU 29 sets the gear ratio γ to the gear ratio γc of a current shift speed (step S210). If it is determined that shifting is being performed, the CPU of the ATECU 29 determines a shift pattern (step S220). In the embodiment, shift patterns include PowerOnUP in which upshift is performed with the engine 12 being in a power-on state, CoastDown in which downshift is performed in a coast state, PowerOffUp in which upshift is performed with the engine 12 being in a power-off state, ManualDown in which downshift is performed by driver's shift operation (L position, 2 position, etc.), and PowerOnDown in which downshift is performed with the engine 12 being in the power-on state. In the case of changing the shift speed by an engagement switching operation of disengaging one of two clutches (brakes) and engaging the other, if the shift pattern is any one of PowerOnUp, CoastDown, PowerOffUp, and ManualDown, the shift speed is changed by handing over transfer of torque from the clutch to be disengaged to the clutch to be engaged in a slip engaged state (torque phase), and then gradually increasing the engaging force of the clutch to be engaged to change the rotational speed of the input shaft 21 to a rotational speed according to the shift speed after shifting (inertia phase). If the shift pattern is PowerOnDown, the shift speed is changed by changing the rotational speed of the input shaft 21 to the rotational speed according to the shift speed after shifting by the output torque from the engine 12 with the clutch to be disengaged being in a slip engaged state, and engaging the clutch to be engaged when a deviation of the rotational speed of the input shaft 21 from the rotational speed according to the shift speed after shifting is less than a predetermined value and it is determined that the rotation has been synthesized.

Figure 7:
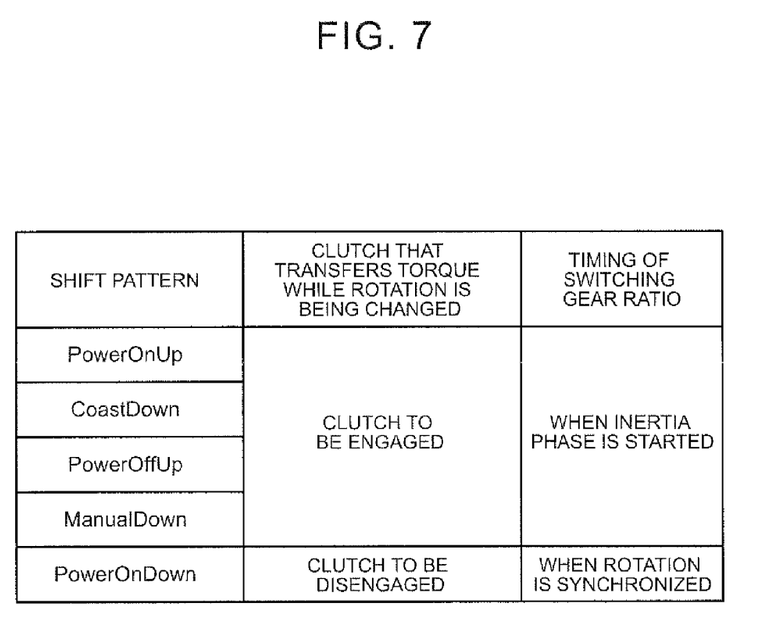
FIG. 7 is an illustration showing the relation between a shift pattern and the timing of switching a gear ratio.

If the determination result of the shift pattern in step S220 is a pattern other than PowerOnDown, namely any one of PowerOnUp, CoastDown, PowerOffUp, and ManualDown, the CPU of the ATECU 29 sets the gear ratio γ for output torque computation to the gear ratio γbe of the shift speed before shifting (step S250) until the inertia phase is started (step S240). After the inertia phase is started (step S240), the CPU of the ATECU 29 sets the gear ratio γ for output torque computation to the gear ratio γaf of the shift speed after shifting (step S260). The start of the inertia phase can be determined by detecting a change in input shaft rotational speed Nin. If the determination result of the shift pattern is the pattern of PowerOnDown, the CPU of the ATECU 29 sets the gear ratio γ for output torque computation to the gear ratio γbe of the shift speed before shifting (step S250) until the rotational speed of the input shaft 21 is synchronized with the rotational speed after shifting (step S270). After the rotational speed of the input shaft 21 is synchronized with the rotational speed after shifting (step S270), the CPU of the ATECU 29 sets the gear ratio γ for output torque computation to the gear ratio γaf of the shift speed after shifting (step S260). Whether the rotation has been synchronized or not can be determined by, e.g., determining if a deviation of the input shaft rotational speed Nin from the rotational speed obtained by multiplying the vehicle speed V by the gear ratio of the shift speed after shifting is less than a predetermined value. The gear ratio γ for output torque computation is thus switched from the gear ratio γbe of the shift speed before shifting to the gear ratio γaf of the shift speed after shifting while shifting is being performed. As shown in FIG. 7, if the shift pattern is any one of PowerOnUp, CoastDown, PowerOffUp, and ManualDown, the timing of switching the gear ratio is when the inertia phase is started. If the shift pattern is PowerOnDown, the timing of switching the gear ratio is when the rotational speed of the input shaft 21 is synchronized with the rotational speed after shifting. That is, in the shifting that is performed by the engagement switching operation, the gear ratio γ for output torque computation is switched from the gear ratio γbe of the shift speed before shifting before transfer of torque is handed over from the clutch to be disengaged to the clutch to be engaged and to the gear ratio γaf of the shift speed after shifting after the transfer of torque is handed over. This is based on the fact that it was verified by the gear ratio of the shift speed after shifting that torque was being transferred by the clutch to be engaged once transfer of torque was handed over from the clutch to be disengaged to the clutch to be engaged.

Figure 8:
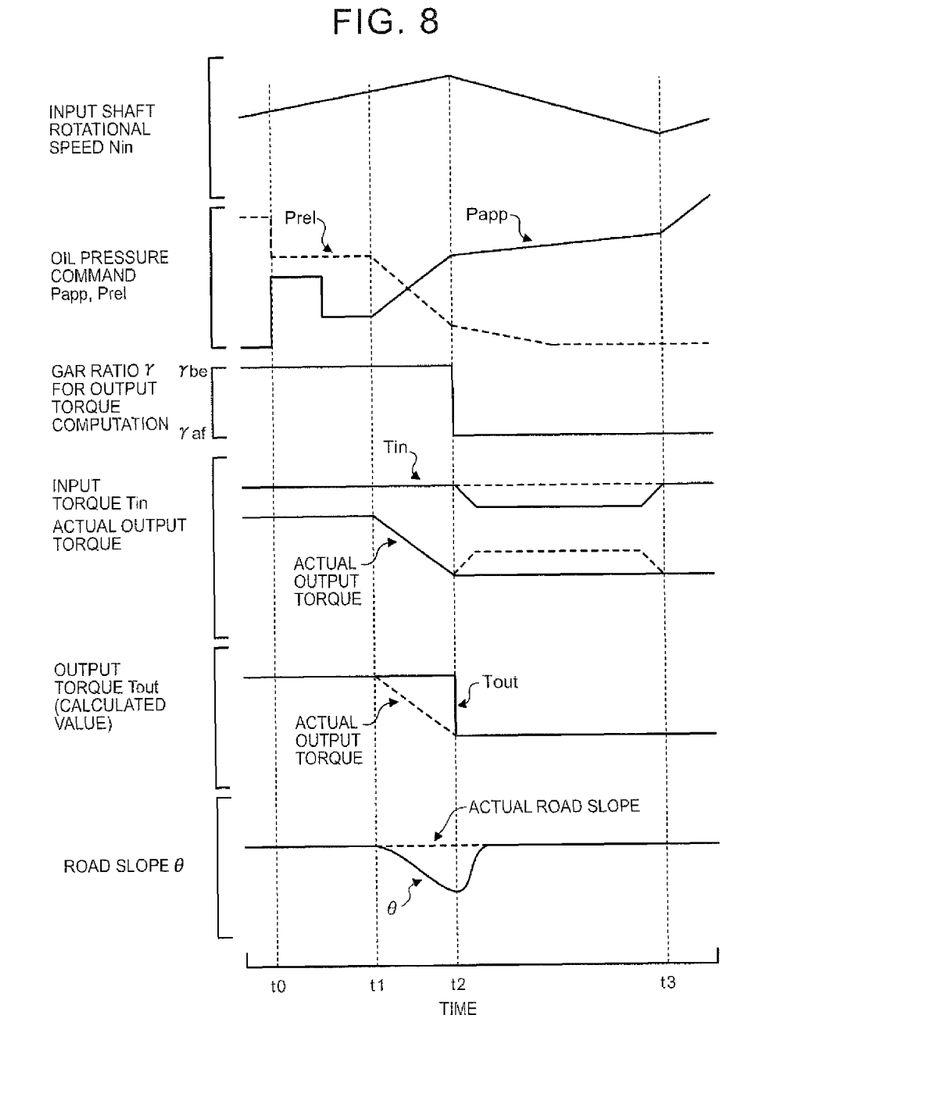
FIG. 8 is an illustration showing how an input shaft rotational speed Nin, oil pressure commands Papp, Prel, a gear ratio γ for output torque computation, input torque Tin, output torque Tout, and a road slope θ change with time during upshift in an embodiment.
Figure 9:
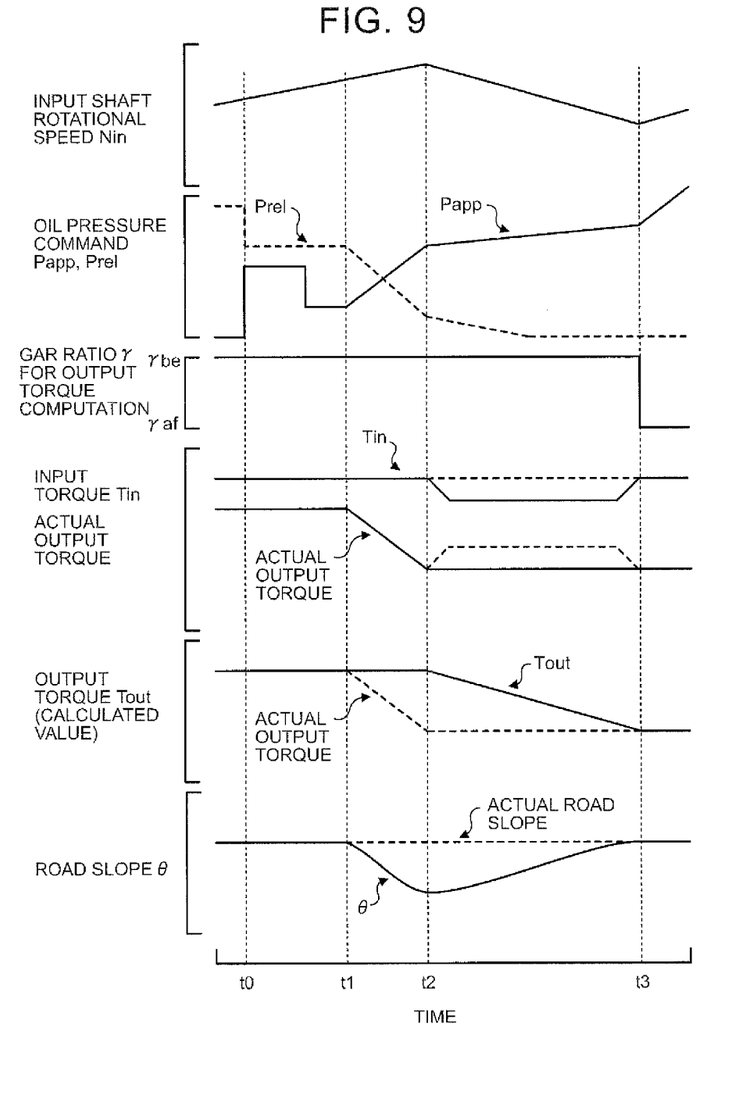
FIG. 9 is an illustration showing how the input shaft rotational speed Nin, the oil pressure commands Papp, Prel, and the gear ratio γ for output torque computation, the input torque Tin, the output torque Tout, and the road slope θ change with time during upshift in a comparative example.

FIG. 8 is an illustration showing how the input shaft rotational speed Nin, the oil pressure commands Papp, Prel, the gear ratio γ for output torque computation, the input torque Tin, the output torque Tout, and the road slope θ change with time during upshift in the embodiment. FIG. 9 is an illustration showing how the input shaft rotational speed Nin, the oil pressure commands Papp, Prel, and the gear ratio γ for output torque computation, the input torque Tin, the output torque Tout, and the road slope θ change with time during upshift in a comparative example. In the comparative example, the gear ratio γbe of the shift speed before shifting is used as the gear ratio γ for output torque computation throughout the shifting. In the embodiment, as shown in FIG. 8, when shifting is started at time t0, the oil pressure command Prel is set so that the clutch to be disengaged is brought into a standby state with the oil pressure for this clutch being slightly reduced, and the oil pressure command Papp is set so that fast fill and low-pressure standby are performed on the clutch to be engaged. The clutch to be disengaged is thus slip engaged, and the clutch to be engaged is held at around a stroke end pressure. Then at time t1 after a predetermined time from the standby state of the clutch to be engaged, a sweep drain process in which the oil pressure command Prel is set so as to gradually reduce the oil pressure for the clutch to be disengaged, and a sweep apply process in which the oil pressure command Papp is set so as to gradually increase the oil pressure for the clutch to be engaged are performed to hand over transfer of torque from the clutch to be disengaged to the clutch to be engaged. When the input shaft rotational speed NM starts to decrease and the inertia phase is started at time t2, the oil pressure command Papp is set so as to slowly increase the oil pressure for the clutch to be engaged, and the rotational speed of the input shaft 21 is changed to the rotational speed according to the shift speed after shifting by the engagement pressure of the clutch to be engaged. Since transfer of torque is performed only by the clutch to be engaged during this period, a computed value of the output torque Tout can be made substantially equal to an actual value thereof by switching the gear ratio γ for output torque computation to the gear ratio γaf of the shift speed after shifting, and the road slope θ can be accurately estimated. In the inertia phase, a reduction process of temporarily reducing the torque of the engine 12 is performed in order to suppress fluctuation of the output torque. During this period, the input torque Tin also decreases, and the output torque Tout is computed based on this input torque Tin. In the comparative example, as shown in FIG. 9, the gear ratio γ for output torque computation is the gear ratio γbe of the shift speed before shifting while shifting is being performed. In this case, computation of the output torque cannot follow a change in actual output torque which is caused when the inertia phase is started. This produces a large gap between the computed value and the actual value of the output torque, making it difficult to accurately estimate the road slope θ.

According to the road slope estimating device of the embodiment described above which computes the output torque Tout based on the input torque Tin and the gear ratio γ of the speed change mechanism 26 and estimates the road slope θ from the reference acceleration abase obtained based on the computed output torque Tout and the actual acceleration α, if the shift pattern is any one of PowerOnUp, CoastDown, PowerOffUp, and ManualDown, the gear ratio γ is set to the gear ratio γbe of the shift speed before shifting until the inertia phase is started, and the gear ratio γ is set to the gear ratio γaf of the shift speed after shifting after the inertia phase is started. This can reduce the gap between the calculated value and the actual value of the output torque Tout, and the road slope θ can be more accurately estimated during shifting. If the shift pattern is PowerOnDown, the gear ratio γ is set to the gear ratio γbe of the shift speed before shifting until the rotational speed of the input shaft 21 is synthesized with the rotational speed after shifting, and the gear ratio γ is set to the gear ratio γaf of the shift speed after shifting after the rotational speed of the input shaft 21 is synchronized with the rotational speed after shifting. Accordingly, the road slope θ can be more accurately estimated during shifting even if the shift pattern is PowerOnDown.

In the embodiment, if the shift pattern is any one of PowerOnUp, CoastDown, PowerOffUp, and ManualDown, the gear ratio γ is switched from the gear ratio γbe before shifting to the gear ratio γaf after shifting at the timing the inertia phase is started. If the shift pattern is PowerOnDown, the gear ratio γ is switched from the gear ratio γbe before shifting to the gear ratio γaf after shifting at the timing the rotational speed of the input shaft 21 is synchronized with the rotational speed after shifting. However, in the shift pattern in one of the above two cases, the gear ratio γ may not be switched during shifting. In this case, the gear ratio γ may be fixed to the gear ratio γbe before shifting while the shifting is being performed.

In the embodiment, the road slope estimating device of the present invention is applied to a device including the six-speed speed change mechanism 26 with the first to sixth forward speeds. However, the present invention is not limited to this, and may be applied to transmissions with any number of shift speeds such as a four-speed transmission, a five-speed transmission, and an eight-speed transmission.

Correspondence between the primary elements of the embodiment and the primary elements of the invention described in "SUMMARY OF THE INVENTION" will be described below. The engine 12 of the embodiment corresponds to the "motor" of the present invention, and the automatic transmission 20 corresponds to the "transmission." The ATECU 29 that executes the road slope estimation process routine of FIG. 5 and step S210 of the output torque computation gear ratio setting process of FIG. 6 corresponds to the "non-shifting road slope estimating section." The ATECU 29 that executes the road slope estimation process routine and steps S220 to S270 of the output torque computation gear ratio setting process corresponds to the "shifting road slope estimating section." The "motor" is not limited to the engine 12 as an internal combustion engine, and may be an electric motor capable of outputting power for traveling or a hybrid system combining an internal combustion engine and an electric motor. The "transmission" is not limited to the one including a torque converter, and may be a transmission including no torque converter and including a starting clutch. In this case, the input shaft of the transmission may not be a turbine shaft but be an output shaft of the starting clutch. The correspondence between the primary elements of the embodiment and the primary elements of the invention described in "SUMMARY OF THE INVENTION" is shown by way of example to specifically describe the best mode in which the embodiment carries out the invention described in "SUMMARY OF THE INVENTION." Thus, this correspondence is not intended to limit the elements of the invention described in "SUMMARY OF THE INVENTION." That is, the invention described in "SUMMARY OF THE INVENTION" should be construed based on the description therein, and the embodiment is merely a specific example of the invention described in "SUMMARY OF THE INVENTION."

Although the mode for carrying out the invention is described above based on the embodiment, it should be understood that the present invention is not limited in any way to such an embodiment, and the present invention can be carried out in various forms without departing from the spirit and scope of the present invention.

INDUSTRIAL APPLICABILITY

The present invention can be used in the automobile industry.

The invention claimed is:

1. A road slope estimating device which is mounted on a vehicle and estimates a slope of a road on which the vehicle is traveling, the vehicle including a motor and a transmission capable of changing a shift speed by an engagement switching operation of disengaging one of a plurality of engagement elements and engaging another one of the plurality of engagement elements, and outputting power from the motor via the transmission to travel, characterized by comprising:
    a shifting road slope estimating section that carries out first road slope estimation in which the output torque is computed based on the input torque and a speed ratio of a shift speed before shifting of the transmission and the road slope is estimated from the computed output torque and acceleration of the vehicle until transfer of torque is handed over from the engagement element to be disengaged of the plurality of engagement elements to the engagement element to be engaged, and carries out second road slope estimation in which the output torque is computed based on the input torque and a speed ratio of a shift speed after shifting of the transmission and the road slope is estimated from the computed output torque and the acceleration of the vehicle when the handover of the transfer of torque is carried out, in a case where the shift speed is being changed by the engagement switching operation.

2. The road slope estimating device according to claim 1, further comprising:
    a non-shifting road slope estimating section that computes the output torque that is output to an output shaft of the transmission, based on the input torque that is applied to an input shaft of the transmission and a speed ratio of a current shift speed of the transmission, and estimates the road slope from the computed output torque and the acceleration of the vehicle, in a case where the shift speed is not being changed by the engagement switching operation.

3. The road slope estimating device according to claim 1, wherein
    the transmission has, as a shift pattern, a first shift pattern in which the shift speed is changed by a torque phase in which the transfer of torque is handed over from the engagement element to be disengaged to the engagement element to be engaged, and an inertia phase in which a rotational speed of the input shaft is changed to a rotational speed according to the shift speed after shifting with the transfer of torque being performed by the engagement element to be engaged, and when the shift speed is changed in the first shift pattern, the shifting road slope estimating section carries out the first road slope estimation until the inertia phase is started, and carries out the second road slope estimation after the inertia phase is started.

4. The road slope estimating device according to claim 1, wherein the transmission has, as the shift pattern, a second shift pattern in which the rotational speed of the input shaft is changed to the rotational speed according to the shift speed after shifting with the transfer of torque being performed by the engagement element to be disengaged, and the engagement element to be engaged is engaged when the rotational speed of the input shaft is changed to the rotational speed according to the shift speed after shifting, and when the shift speed is changed in the second shift pattern, the shifting road slope estimating section carries out the first road slope estimation until the rotational speed of the input shaft is changed to the rotational speed according to the shift speed after shifting, and carries out the second road slope estimation after the rotational speed of the input shaft is changed to the rotational speed according to the shift speed after shifting.

* * * * *